United States Patent
Karpoor et al.

(10) Patent No.: US 11,683,676 B2
(45) Date of Patent: Jun. 20, 2023

(54) METHOD AND APPARATUS FOR PROVIDING MULTI-TIER FACTORY RESET OF A CONVERGED COMMUNICATION DEVICE

(71) Applicant: MOTOROLA SOLUTIONS, INC., Chicago, IL (US)

(72) Inventors: Sanjaykumar S Karpoor, Buffalo Grove, IL (US); Mykola Nikolayev, Hallandale, FL (US); Robert Hartman, Cooper City, FL (US); Yuval Namir, Yad Binyamin (IL); Mark Antilla, Davie, FL (US); Graeme Johnson, Plantation, FL (US); Daniel P Zetzl, Bartlett, FL (US)

(73) Assignee: MOTOROLA SOLUTIONS. INC., Chicago, IL (US)

( * ) Notice: Subject to any disclaimer, the term of this patent is extended or adjusted under 35 U.S.C. 154(b) by 21 days.

(21) Appl. No.: 17/445,508

(22) Filed: Aug. 20, 2021

(65) Prior Publication Data
US 2023/0054239 A1   Feb. 23, 2023

(51) Int. Cl.
*H04W 8/22* (2009.01)

(52) U.S. Cl.
CPC ..................... *H04W 8/22* (2013.01)

(58) Field of Classification Search
CPC ....... H04W 8/22; H04W 16/14; H04W 76/10; H04W 76/15; H04W 88/06; H04W 72/1215; H04W 36/28
See application file for complete search history.

(56) References Cited

U.S. PATENT DOCUMENTS

| | | | |
|---|---|---|---|
| 4,823,256 A | 4/1989 | Bishop et al. | |
| 9,071,518 B2 | 6/2015 | Malik et al. | |
| 9,258,833 B2 * | 2/2016 | Bitran | H04W 16/14 |
| 9,276,740 B2 * | 3/2016 | Nix | H04W 52/0277 |
| 9,439,025 B1 | 9/2016 | Ghoshal et al. | |
| 10,452,877 B2 * | 10/2019 | Chis | G06K 7/10465 |
| 10,506,398 B2 * | 12/2019 | Urbanek | H04W 4/50 |
| 10,795,422 B2 | 10/2020 | Grobe-Sachs et al. | |
| 10,848,343 B2 | 11/2020 | Endo et al. | |
| 10,956,141 B2 * | 3/2021 | Lee | G06F 21/6245 |
| 2002/0002631 A1 * | 1/2002 | Haulund | G06F 13/405 |
| | | | 719/314 |
| 2007/0275746 A1 * | 11/2007 | Bitran | H04W 16/14 |
| | | | 455/552.1 |
| 2012/0044913 A1 * | 2/2012 | Smadi | H04L 5/0062 |
| | | | 370/336 |
| 2017/0139721 A1 * | 5/2017 | Feehrer | G06F 13/20 |
| 2019/0079501 A1 * | 3/2019 | Koga | G01D 21/00 |
| 2019/0306957 A1 * | 10/2019 | Maeda | H05B 45/20 |
| 2020/0008167 A1 * | 1/2020 | Venkataraman | H04W 36/0022 |
| 2020/0401384 A1 * | 12/2020 | Lee | G06F 9/4401 |

* cited by examiner

*Primary Examiner* — Congvan Tran
(74) *Attorney, Agent, or Firm* — Barbara R. Doutre

(57) ABSTRACT

A converged communication device comprises a first processor operable using a first communications protocol and a second processor operable using a second communications protocol. The first processor is configured to detect a factory reset. The factory reset selectively enables one of a multi-tier factory reset comprising: a factory reset of both the first and second processor; a factory reset of the first processor only; and a factory reset of the second processor only. The configuration may be triggered by an external input to the converged communication device.

30 Claims, 6 Drawing Sheets

METHOD AND APPARATUS FOR PROVIDING MULTI-TIER FACTORY RESET OF A CONVERGED COMMUNICATION DEVICE

BACKGROUND OF THE INVENTION

Converged communication devices, such as converged portable radios, are utilized to perform different types of communication, for example land mobile radio (LMR) communication and long-term evolution (LTE) communication. Converged portable radios are typically powered by a battery and include multiple components, including transceiver circuitry controlled by a plurality of different processors.

Different or upgraded radio reconfigurations may be desired after a radio has left the factory and has been deployed to the field. These reconfigurations often require a factory reset. Reconfigurations involving a factory reset typically require returning the radio to the manufacturer (either to the manufacturer's factory or the manufacturer's repair service center) to perform the factory reset. Such remote site reconfigurations incurs down time and cost. Performing a remote site factory reset further runs the risk of losing programmed personalized settings, such as LMR settings (e.g. loss of programmed volume control settings, talkgroup settings, preferred channel settings, and encryption parameters to name a few), and/or loss of programmed personalized LTE settings (e.g. loss of apps, contacts and photos to name a few).

Accordingly, there is a desire to facilitate factory reset for a converged communication device without having to send the device back to the manufacturer.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
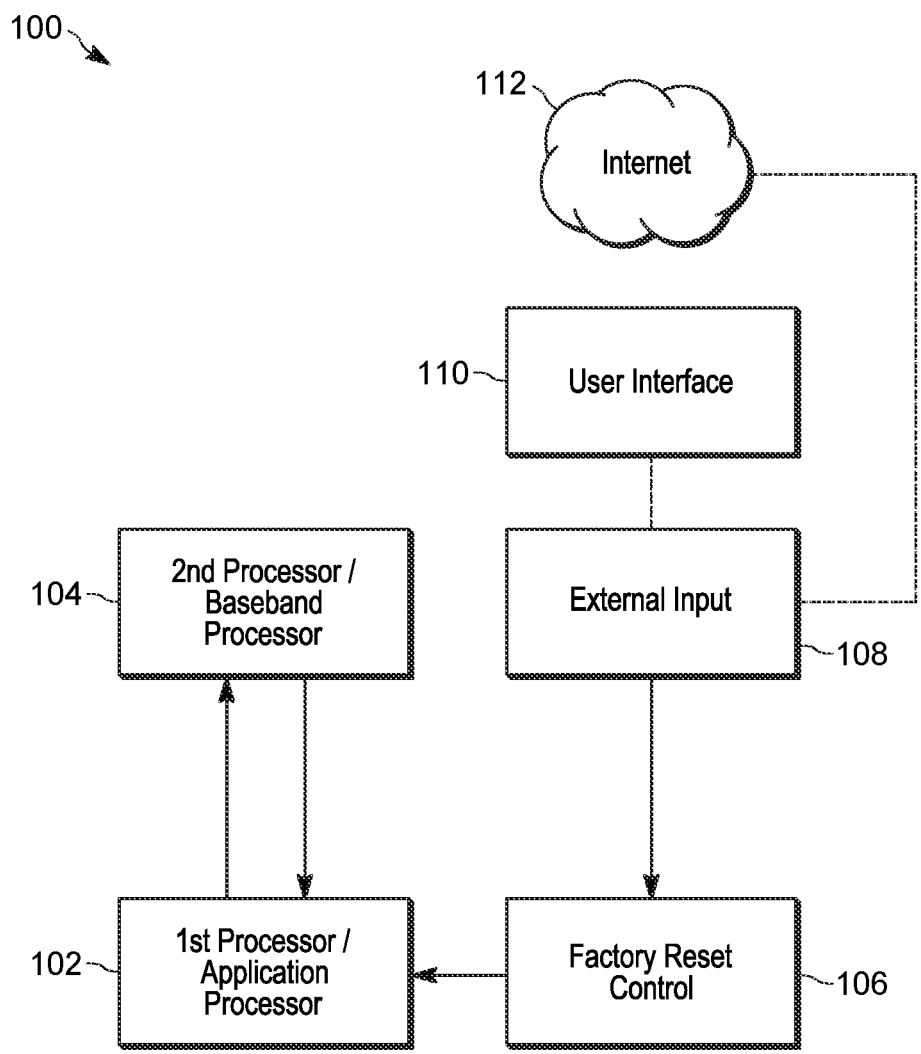
FIG. 1 is a block diagram illustrating an example converged communication device supporting factory reset, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The system, method, and apparatus components have been represented where appropriate by suitable symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Briefly there is provided herein a converged communication device and method to provide a factory reset to the converged communication device. The converged communication device may be a portable converged radio or mobile vehicular radio used by public safety personnel, such as law enforcement, paramedic, and/or security personnel. The factory reset is performed without manufacturer intervention, thereby minimizing downtime and cost. The factory reset can be performed post-deployment of the device to the field by an end-user consumer, an IT administrator and/or a dealer/distributor, without having to return the device to a factory or repair service center associated with the manufacturer.

The converged communication device of the various embodiments comprises a first processor operating using a first communications protocol; a second processor operating using a second communications protocol, the first and second processors providing communications for the converged communication device; the first processor being configured to detect a factory reset, the factory reset selectively enabling one of a multi-tier factory reset comprising: a factory reset of both the first and second processor; a factory reset of the first processor only; and a factory reset of the second processor only. The configuration may be triggered by an external input to the converged communication device. The external input trigger to the converged communication device may be triggered by one of a plurality of sources such as a user interface of the converged communication device, for example a user input command via a touch screen, keypad, or verbal command; a cloud based internet wireless command to the converged communication device; or a wired input, such as a laptop sending a command to the radio via a universal serial bus (USB) interface. The second processor may include a watchdog timer for detecting interruptions in inter-processor communications, the watchdog timer being stopped during the factory reset while inter-processor communications (IPC) are suspended. For a factory reset to the first processor only, the factory reset may be delayed or paused to complete mission critical processes taking place at the second processor.

The method to provide the factory reset to the converged communications device comprises operating a first processor using a first communications protocol, operating a second processor using a second communications protocol, detecting a factory reset by the first processor, the factory reset selectively enabling one of a multi-tier factory reset comprising: a factory reset of both the first and second processor; a factory reset of the first processor only; and a factory reset of the second processor only. The method may further include suspending inter-processor communications (IPC) during the factory reset; and stopping an IPC watchdog timer of the second processor while inter-processor communications are suspended. For a factory reset of the first processor only, the method may further include delaying or pausing the first processor to complete mission critical processes taking place at the second processor.

Referring now to FIG. 1, there is provided a block diagram illustrating a converged communication device 100 supporting a factory reset in accordance with various embodiments. Portable communication device 100 comprises a first processor 102 operable using a first communications protocol and a second processor 104 operable using a second communications protocol. The first and second processors 102, 104 provide a converged portable communication device, where the device can run different types of communication in parallel or independently. The first processor 102 may be an applications processor. The applications processor may be, for example, a broadband applications processor, such as an Android applications processor. The first processor 102 may be operable, for example, using a long term evolution (LTE) protocol that supports cell phone, video, music, digital personal assistant capabilities, and other broadband data. A consumer-level operating system (OS) may execute on applications processor to provide for one or more communications and applications. For example, the consumer-level OS may be implemented based on an Android operating system or an open source operating systems, such as Tizen. For the purposes of this application, the first processor 102 may also be referred to as the applications processor (AP) 102.

The second processor 104 may be a baseband processor (BP). The baseband processor may support communications for public safety and mission critical operations, including but not limited to, one or more communications over high-powered land mobile radio (LMR), narrowband voice, such as push-to-talk (PTT), and mission critical narrowband data. For the purposes of this application, the second processor 104 may also be referred to as the baseband processor (BP) 104.

Serial control buses such as I²C, serial peripheral interface (SPI) buses and appropriate buffers (not shown) may be used for intercommunication between the application processor and the baseband processor. The use of the dual processors allow the converged radio the advantageous ability to support parallel functions such as public safety long-term evolution (PS LTE) and mission critical push-to-talk over long-term evolution (MSPTT over LTE). The first processor 102 (AP) may support one or more communications, including but not limited to, geofencing using a global positioning system (GPS), broadband and wireless local area networking (e.g., Wi-Fi), Bluetooth audio, and consumer long-term evolution (LTE).

In accordance with the embodiments, the first processor 102 (AP) is configured to detect a factory reset 106, the factory reset selectively enabling one of a multi-tier factory reset comprising: a factory reset of both the first and second processors 102, 104; a factory reset of the first processor 102 only; and a factory reset of the second processor 104 only.

In response to the first processor 102 selectively enabling the factory reset of both the first and second processors 102, 104, the first processor is reset and the second processor is reset independently of the first processor, and the second processor waits for the first processor to initiate communication prior to resuming second processor normal operation. This reconfiguration capability now beneficially allows, for example, a factory reset to both an Android applications processor and an LMR processor of a deployed converged device to be performed without manufacturer intervention, such as a by a dealer, an IT administrator, and/or an end-user consumer. For example, a test mode may be built into an application that runs on the AP to trigger a factory reset which will factory reset both the AP and the BP. Alternatively, an end-user consumer, IT administrator, and/or dealer may have administrative access privileges to a cloud device management tool, such as a radio central tool, which allows the end-user consumer to initiate a factory reset that resets both AP and BP. The portable communication device 100 is thus able to be reconfigured without factory or repair service center intervention.

In response to the first processor 102 selectively enabling the factory reset of the first processor only, the second processor 104 pauses communication with the first processor and waits for the first processor to reestablish communication prior to resuming second processor normal operation. A factory reset of the first processor-only enables first processor management while preserving second processor configuration. For example, an Android only factory reset of the converged device may be performed by an Android user IT administrator for broadband device applications management while preserving LMR configuration of the LMR baseband processor. As another example, an end-user consumer, having permissible access privileges, can use the factory reset provided by Android to initiate an AP only factory reset. Again, the converged portable communication device 100 is able to be advantageously reconfigured without factory or repair service center intervention.

In response to the first processor 102 selectively enabling the factory reset of the second processor-only, the first processor 102 waits for the second processor 104 to reestablish communication prior to resuming first processor normal operation. For example, a factory reset to an LMR baseband processor (second processor 104) may be performed to migrate LMR operation to a higher capacity system, while preserving an Android configuration of an Android processor (at first processor 102). With appropriate access privileges, an end-user consumer, dealer and/or IT administrator can perform the factory reset. For example, if the end-user consumer has administrative access to the cloud device management tool (such as a radio central tool), the end user or the IT administrator of the end-user consumer can initiate BP factory reset. Here again, the converged portable communication device 100 is advantageously able to be reconfigured without manufacturer intervention, thereby negating the need to return the device to the factory or repair service center.

In accordance with the embodiments, the factory reset 106 is triggered by an external input 108 to the portable communication device. For example, the factory reset 106 may be triggered by via a user interface 110 at the portable communication device, such as via a voice control input or input to a touch screen or keypad entry or other user interface input of the device. Alternatively, the factory reset 106 may be triggered via a wireless communication from a wireless cloud based internet server 112. As another alternative, the factory reset 106 may be triggered via a wired input to the device, such as a laptop sending a command to the device via a USB. Thus, reconfiguration of the converged communication device is now able to be performed without manufacturer intervention, allowing the device to remain on-premise, thereby expediting the reconfiguration and advantageously minimizing time and expense.

Different deployment approaches can be used to control and/or limit access to the factory reset. For example, in some deployment scenarios, it may be preferable to limit access to the factory reset to an IT administrator, and prevent end-user consumer access to the cloud based device management tool. The on-device factory reset application may also be blocked by an IT administrator to prevent end-user consumer access to the factory reset. For deployments directly to the end-user consumer, where there is no IT administrator, the end-user consumer would have access to the factory reset application. It is also possible that in some deployments, both an IT administrator and end-user consumer would have access to the factory reset application. There may also be deployments were some factory resets are permitted by the end-user consumer and others limited to an IT administrator. The access control to the factory reset(s) can be updated, for example, by updates to software releases for the device.

Factory resets may be desired under various use cases, such as when migrating LMR operation to a higher capacity system (BP only), enrolling in new applications (AP only), moving the radio from one user to another (AP only); and/or when a device is lost or stolen (AP and BP) or resold (AP and BP). Factory resets may be desirable to end users wishing to retain private encryption without permitting access while a device is being repaired. The embodiments provided herein advantageously protect the second processor 104 (BP) during a factory reset of the first processor 102 (AP), and also protect the first processor 102 (AP) during a factory reset of the second processor 104 (BP). The embodiments provided herein advantageously facilitate the return of a radio or return of rental radios by enabling the radios to be wiped clean of end user customer parameters before returning the devices to the distribution center. The embodiments facilitate reconfiguring radios when passwords have been forgotten.

The Table shown below lists just a few examples of desirable reconfiguration scenarios:

|  | BP Only | AP Only | AP and BP |
|---|---|---|---|
| LMR system migration capacity upgrade | X | | |
| App enrollment | | X | |
| Moving Device from one User to Another (reassign to another user) | | X | |
| Device is Lost or Stolen | | | X |
| Device is Resold | | | X |

The Table shows example use cases involving factory resets, such as a radio migrating LMR operation to a higher capacity system (BP only), a radio enrolling a new application (AP only), moving the radio from one user to another (AP only); the radio being lost or stolen (AP and BP), and the being resold (AP and BP), to name a few.

The BP factory reset may be either BP Only (in which case all of the AP configurations such as contacts, photos, etc are maintained) or AP and BP (where the AP contacts, photos, are cleared). The AP factory reset may be either AP Only (in which case all of the BP configuration, such as talkgroups, frequency settings, etc are maintained) or AP and BP (where the BP configurations are cleared). Hence, when only one processor is factory reset, the other processor's configurations advantageously remain intact.

FIGS. 2A, 2B, 2C, and 2D portray flow diagrams for a variety of use cases for a factory reset of the portable communication device 100 of FIG. 1 in accordance with some embodiments. In FIGS. 2A, 2B, 2C, and 2D the first processor will be referred to as application processor (AP) 102, and the second processor will be referred to as a baseband processor (BP) 104.

Figure 2A:
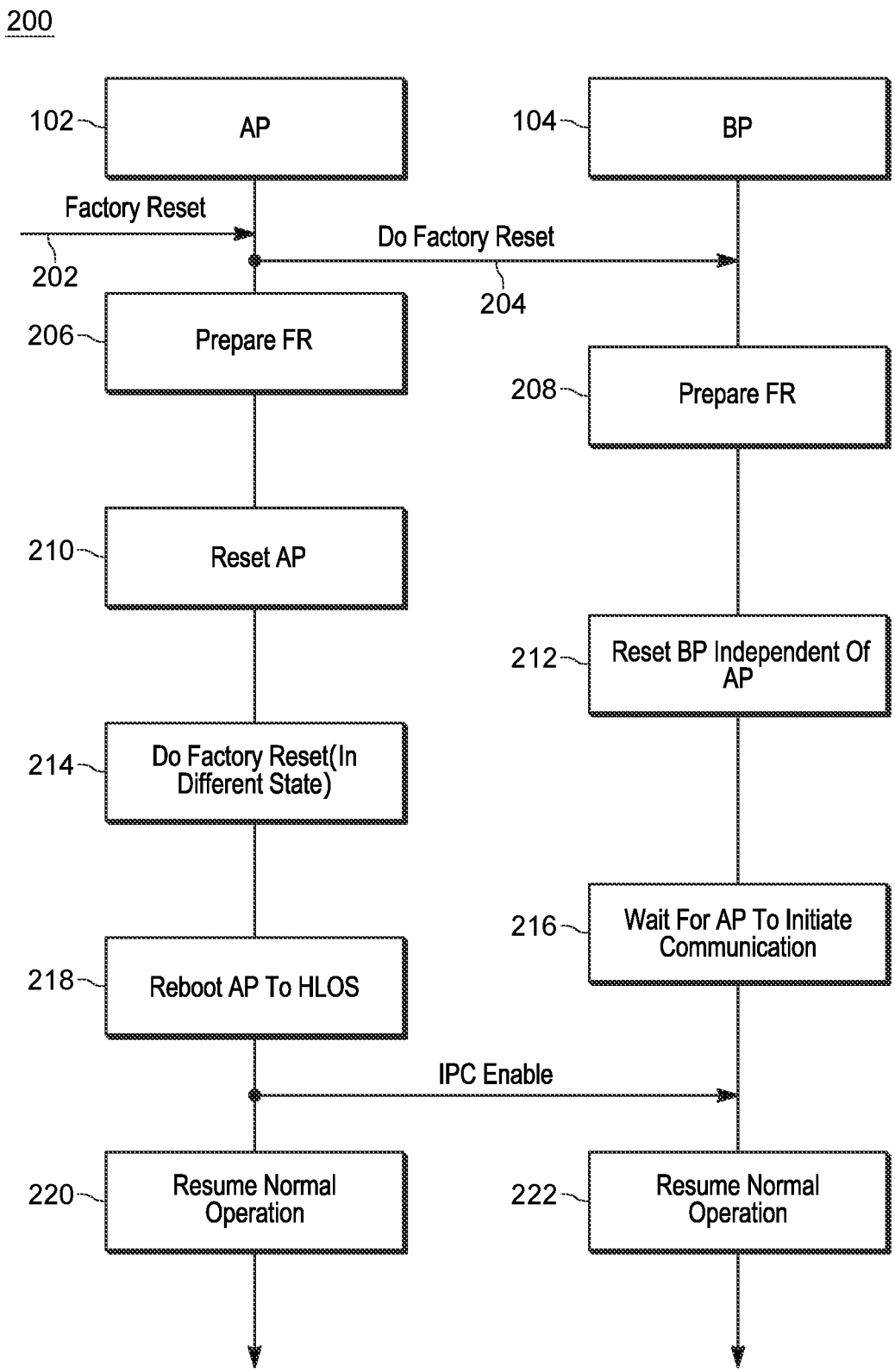
FIG. 2A is a flow diagram illustrating a first use case for factory reset of the converged communication device, in accordance with some embodiments.

FIG. 2A is a flow diagram illustrating a first use case 200 for a factory reset of the portable communication device of FIG. 1, in accordance with some embodiments. The first use case 200 is directed to providing factory reset to both the first and second processors, the AP 102 and the BP 104. An external factory reset trigger 202 is received at the AP 102 through, for example, a wireless cloud based internet server, user interface entry of the communication device and/or wired input to the communication device. The AP 102 then triggers the factory reset of the BP 104, at 204. Both AP 102 and BP 104 then independently prepare for a factory reset at 206, 208. Preparing for a factory reset of the AP may involve, for example, setting internal flags to communicate with low level boot loader or recovery services, determining if external storage also needs to be cleared, marking partitions as delete or save, to name a few.

Preparing for a factory reset of the BP may involve, for example, setting a flag in flash to tell the BP to restore the factory default configuration at the next power up. The reset of AP occurs at 210, and the reset of the BP occurs, at 212, independently of the AP. The reset of the BP at 212 clears BP configurations and returns setting to defaults. The reset of the AP at 210 is more complex, as it may involve placing the AP in different states 214 for different applications (apps), such as wiping clean a contacts list, deleting photos, banking apps, business apps, to name a few. The independently reset BP waits, at 216, for the AP to be updated prior to initiating any communication. Generally a factory reset is independent of an update or configuration change. Once a factory reset has been completed, a configuration update will generally follow to set the new configuration.

The AP is rebooted, at 218, with a high-level operating system (HLOS) which enables the AP to engage in trusted execution of code. The rebooted AP can now resume normal operation at 220, while sending an inter-processor communication (IPC) to the BP to resume normal BP operation at 224, and manage shared data therebetween.

In accordance with the first use case 200, the BP is independently reset from the AP. Resetting the BP independently of the AP is advantageous in that the less time is taken to prepare and reset the BP. The BP is thus ready and waiting to resume normal operation without delays which might otherwise occur during co-processing AP updates.

Figure 2B:
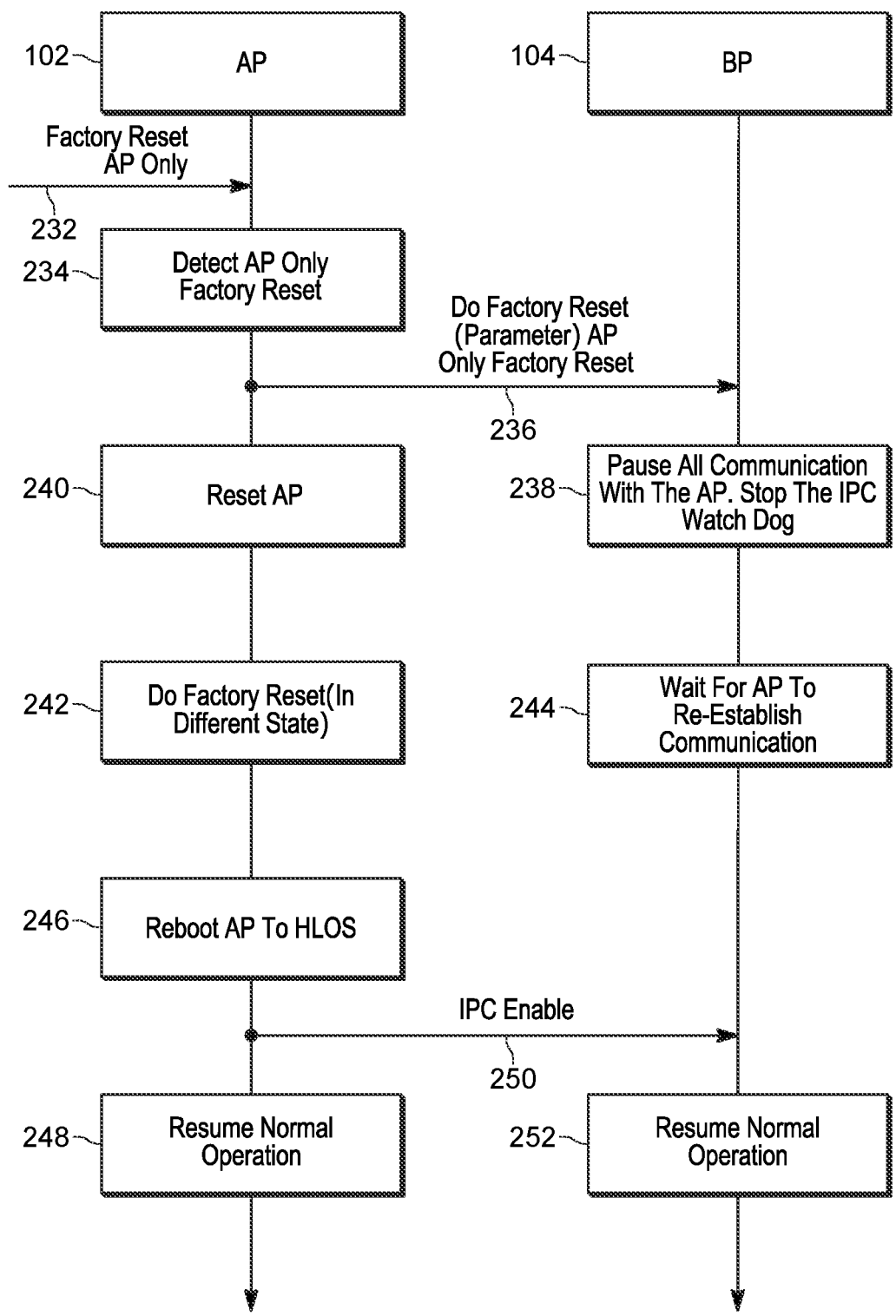
FIG. 2B is a flow diagram illustrating a second use case for factory reset of the converged communication device, in accordance with some embodiments.

FIG. 2B is a flow diagram illustrating a second use case 230 for a factory reset of the portable communication device of FIG. 1, in accordance with some embodiments. The second use case 230 is directed to providing a factory reset to only the AP 102, without impacting the BP 104. An external factory reset trigger 232 indicative of an AP only reset is received at the AP 102 through, for example a wireless cloud based server, user interface to the communication device, and/or wired input to the communication device. The AP 102 detects the AP only factory reset at 234. The AP 102 sends a notification, at 236, to the BP 104 indicating that an AP only factory reset will be taking place, and a reason for that AP only factory reset to be taking place, such as those previously discussed (e.g. see Table).

The notification 236 causes the BP 104 to pause all inter-processor communication (IPC) with the AP 102 at 238, and further causes an IPC watchdog timer of the BP, to be stopped, thereby preventing any inadvertent communications to be received by the BP 104 from the AP 102. The pausing of the IPC prevents inadvertent communications. The stopping of the watchdog timer advantageously prevents the BP from reacting to a lack of inter-processor communication.

The AP is reset at 240. The AP goes offline to complete the factory reset. The factory reset of the AP may also involve placing the AP in different states at 242 in order to clear out different applications (apps). such as wiping clean a contacts list, deleting photos, banking apps, business apps, and mission critical communication apps, to name a few. The AP then reboots to the high level operating system (HLOS) at 246 with the apps set to default settings. During this time the BP waits, at 244, for the AP to reestablish communication with the BP. The rebooted AP sends an inter-processor communication (IPC) enable signal to the BP at 250 to reestablish IPC communications. Reestablishing the IPC communications allows normal AP operations and BP operation to resume at 248, 250.

In accordance with the embodiments, the second use case 230 allows the AP to be factory reset without negatively impacting the BP, thereby avoiding defects such as crashes, lockups and the like.

Figure 2C:
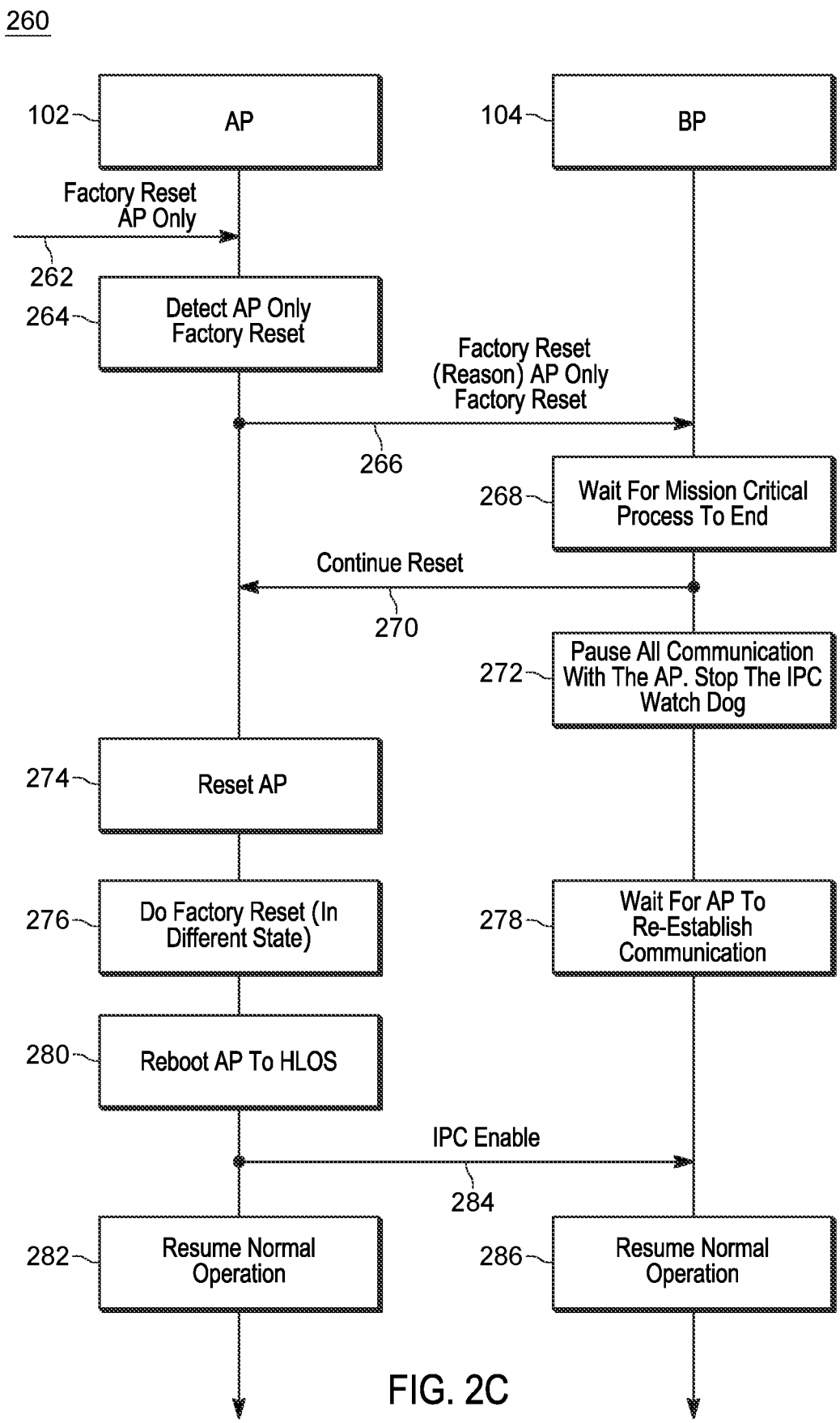
FIG. 2C is a flow diagram illustrating a third use case for factory reset of the converged communication device, in accordance with some embodiments.

FIG. 2C is a flow diagram illustrating a third use case 260 for factory reset of the portable communication device of FIG. 1, in accordance with some embodiments. The third use case 260 is directed to providing a factory reset to only the AP 102, and further providing limited additional control for the BP to stop or delay the AP update for predetermined mission critical processes. Such predetermined mission critical processes may comprise for example, low battery detection, in-progress emergency call, or other mission critical reason for maintaining the BP operation. The BP is thus advantageously able to control a "go/no-go" to the AP's factory reset in order to protect BP mission critical communication.

As described previously, an external factory reset trigger 262 indicative of an AP only reset is received at the AP 102 through, for example a wireless cloud based internet server, user interface of the communication device, and/or a wired input to the communication device. The AP 102 detects the AP only factory reset at 264. The AP 102 sends a notification, at 266, to the BP 104 indicating that an AP only factory reset will be taking place, and the reason for that AP only reset. Such reasons for resetting the AP might include, for example, a transfer of a device between different users in the same customer/agency/organization, to name a few.

In accordance with this embodiment, the AP only factory reset can be delayed or paused for the completion of mission critical processes, such as emergency call, low battery detection, or other mission critical reason taking place at the BP. In response to the AP only factory reset notification at 266, the BP waits until BP mission critical processes have ended at 268 (e.g. call completed, battery charged, etc), and then the BP sends a continue factory reset message back to the AP processor at 270.

After the mission critical processes have ended at 268 and the continue factory reset message has been sent at 270, the BP pauses all further inter-processor communication (IPC) with the AP at 272. The pausing of the IPC prevents inadvertent communications. At 272, the BP also causes an IPC watchdog timer of the BP, to be stopped. The stopping of the "watchdog timer" advantageously prevents the BP from reacting to a lack of inter-processor communication. The watchdog timer is normally used to detect if the AP is stuck (hung up) and could be falsely triggered during AP factory reset unless suspended.

In response to the continue factory reset message at 270, the AP begins (or continues) with the reset, at 274. The AP reset may involve, for example, wiping clean a contacts list, deleting photos, banking apps, business apps, and mission critical communication apps, to name a few, and returning setting to defaults.

The factory reset of the AP may also involve placing the AP in different states, at 276, to reconfigure different applications (apps) back to default settings. During this time the BP continues to wait, at 278, for the AP to reestablish communication. Once a reboot of the AP to the high level operating system takes place, at 280, the rebooted AP resumes normal operation at 282, while sending, at 284, an inter-processor communication (IPC) to the BP to resume normal BP operation at 286, and manage shared data therebetween.

Figure 2D:
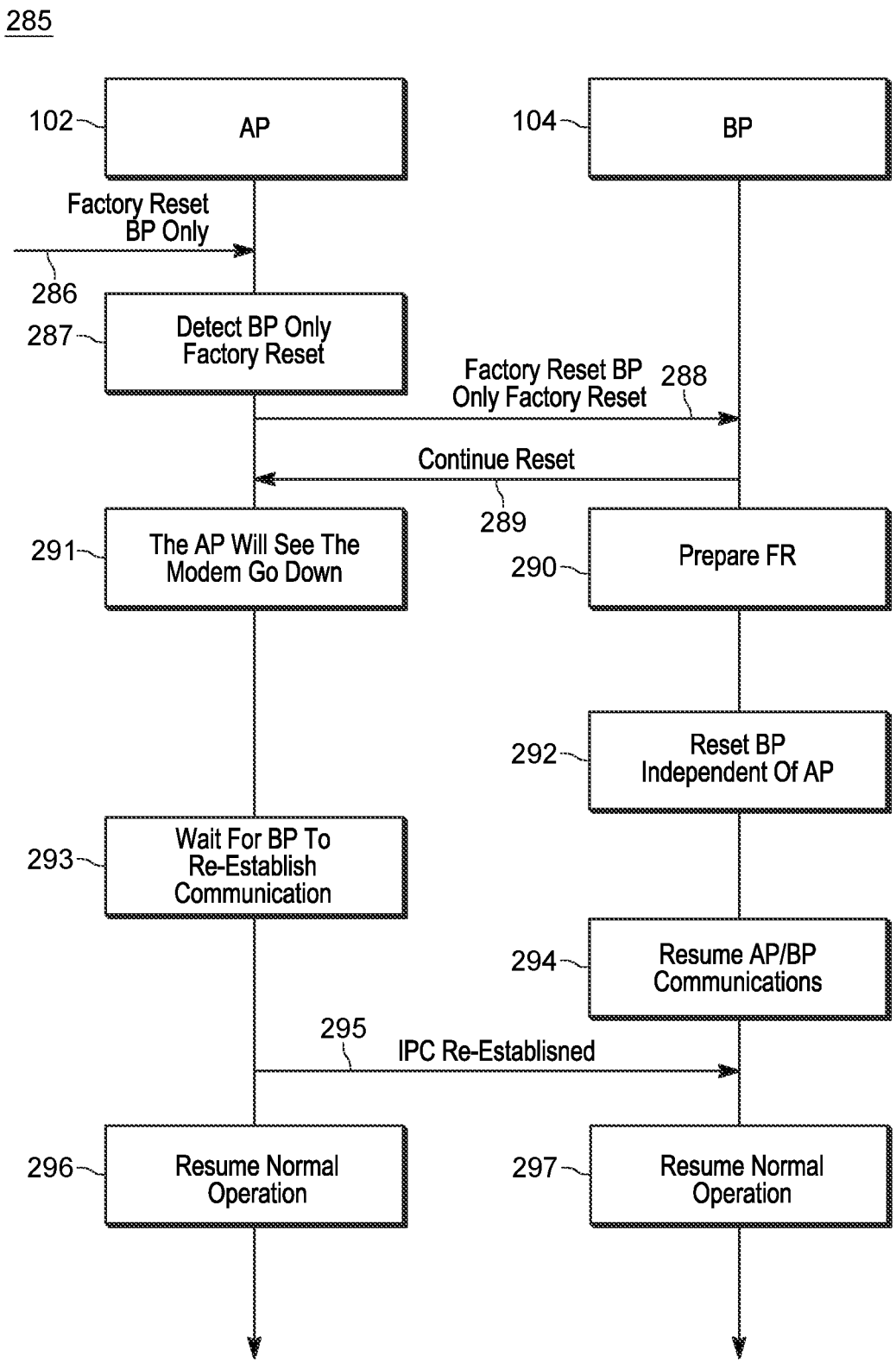
FIG. 2D is a flow diagram illustrating a fourth use case for factory reset of the converged communication device, in accordance with some embodiments.

FIG. 2D is a flow diagram illustrating a fourth use case 285 for a factory reset of the portable communication device of FIG. 1, in accordance with some embodiments. The fourth use case 285 is directed to providing factory resets to only the BP 104, using a factory reset command to the AP. An external factory reset trigger 286 is received at the AP 102 through, for example a wireless cloud based internet server, user interface of the communication device, and/or wired input to the device. The AP 102 detects, at 287, that the trigger is a BP-only factory reset. The AP 102 sends, at 288, a factory reset BP-only command to the BP. The BP 104, in response thereto, sends a confirmation, at 289, to the AP confirming that the BP will be performing the BP-only reset. Hence, a handshake occurs between the AP and BP (at 288, 289) to set forth the BP-only factory reset.

The BP prepares the factory reset at 290 by shutting down the BP modem. The AP detects, at 291, the BP modem being shut down and waits at 293, while the BP independently resets itself of the AP at 292. The BP resumes AP/BP communications at 294 by turning on the IPC so that the BP can receive an IPC communication at 295 to reestablish IPC communications, which enables normal communications operation to resume at 296, 297.

Hence, in the fourth use case, the BP has been able to be independently updated via an AP command, and without loss of data to the AP. The AP is put into a holding pattern, while the BP is being reset. The holding pattern is set by the handshake between the AP and BP.

In accordance with the fourth use case 285, the BP 104 is independently reset from the AP 102. Resetting the BP independently of the AP is advantageous in that the less time is taken to prepare and reset the BP. The AP is thus ready and waiting to resume normal operation without delays which might otherwise occur during co-processing AP updates.

Figure 3:
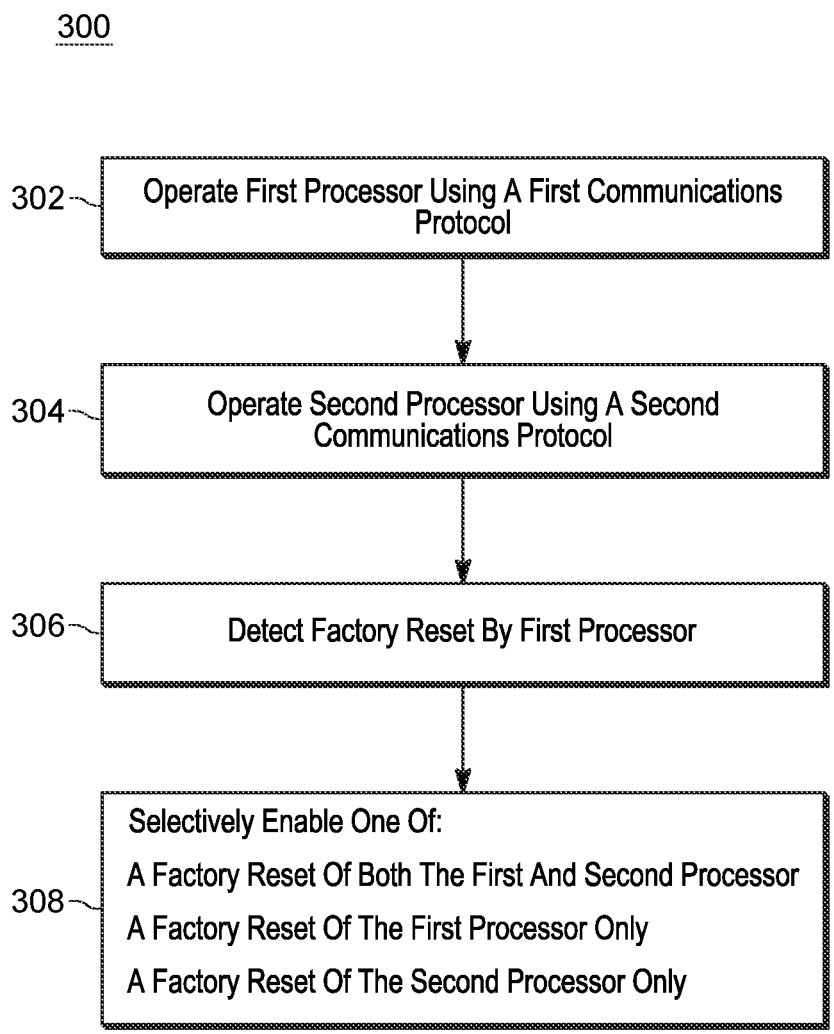
FIG. 3 is a flowchart illustrating a method for managing factory reset on a converged communication device, in accordance with some embodiments.

FIG. 3 is a flowchart illustrating a method 300 for managing a factory reset on the portable communication device of FIG. 1, in accordance with some embodiments. Method 300 begins by providing a converged portable communication device having first and second processors operable on first and second communication protocols at 302, 304. For example, the first processor may be an application processor supporting a broadband communication protocol, such as LTE, and the second processor may be a baseband processor supporting a narrowband communication protocol, such as LMR. The first processor is further operable with an applications operating system, such as an Android™ operating system. The portable communication device may operate the communication protocols independently or in parallel.

A factory reset is detected at the applications processor of the communication device, at 306. The factory reset may be entered to the communication device via an external input to the portable communication device. The external input trigger to the converged communication device may be triggered by one of: a user interface of the portable communication device; or a cloud based internet wireless communication to the portable communication device. The user interface input to the device may include, for example, an input to a touch screen to the portable communication device, a physical button press, an audio voice control command to the portable communication device, and/or a pull-down menu selection of the portable communication device. The wireless cloud based internet communication may originate from configuration software carrier, Open Mobile Alliance Device Management (OMA DM) console, and/or dispatch console to name a few. The wireless cloud based internet communication is received at the portable communication device without factory intervention.

A factory reset is selectively enabled, at 308, from a multi-tier factory reset comprising: a factory reset to both the first and second processor; a factory reset of the first processor only; and a factory reset of the second processor only.

At step 308, in response to the first processor selectively enabling the factory reset of both the first and second processors, the first processor is reset and the second processor is reset independently of the first processor and the second processor waits for the first processor to initiate communication prior to resuming second processor normal operation;

At step 308, in response to the first processor selectively enabling the factory reset of the first processor only, the second processor pauses communication with the first processor and waits for the first processor to reestablish communication prior to resuming second processor normal operation.

At step 308, in response to the first processor selectively enabling the factory reset of the second processor only, the first processor waits for the second processor to reestablish communication prior to resuming first processor normal operation.

During the factory resets provided by method 300, all inter-processor communications (IPC) are suspended as previously described, and an IPC watchdog timer of the second processor is stopped while the inter-processor communications are suspended.

Accordingly, there has been provided a converged communication device and method of operating the converged communication device that allows factory resets to be performed without factory intervention, such as by a dealer, IT administrator, and/or end-user consumer. The ability to provide local on-site factory resets saves time, expense, allows for the protection of encrypted radio parameters, and protects customer information.

The factory reset approach provided by the various embodiments provides several advantages. For example, the ability to perform a factory reset locally not only allows personalized settings to be preserved but also allows personalized settings to be cleared out when desired. For example, a user may wish to maintain LMR settings (such as programmed volume control settings, talkgroup settings, preferred channel settings, encryption parameters, and mission critical features for the end user customer to name a few). while the LTE processor is factory reset. Alternatively, a user may want to retain personalized LTE settings (e.g. apps, contacts and photos to name a few) while the LMR processor is factory reset. The further ability to clear out all of personalized settings associated with both the LTE and LMR processors is also beneficial in situations where the converged communication device is being returned to a rental company or otherwise being shared or loaned out to others.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the system, method, or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and integrated circuits (ICs) with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of any single disclosed embodiment. Thus the following claims are hereby incorporated into the Detailed Description, with each claim standing on its own as a separately claimed subject matter.

We claim:

1. A converged communication device, comprising:
   a first processor operable using a first communications protocol;
   a second processor operable using a second communications protocol, the first and second processors providing communications for the converged communication device;
   the first processor being configured to detect a factory reset, the factory reset selectively enabling one of a multi-tier factory reset to restore factory default configurations comprising:
      a factory reset of both the first and second processor;
      a factory reset of the first processor only; and
      a factory reset of the second processor only.

2. The converged communication device of claim 1, wherein:
   in response to the first processor selectively enabling the factory reset of both the first and second processors, the first processor is reset and the second processor is reset independently of the first processor and the second processor waits for the first processor to initiate communication prior to resuming second processor normal operation;
   in response to the first processor selectively enabling the factory reset of the first processor only, the second processor pauses communication with the first processor and waits for the first processor to reestablish communication prior to resuming second processor normal operation; and
   in response to the first processor selectively enabling the factory reset of the second processor only, the first processor waits for the second processor to reestablish communication prior to resuming first processor normal operation.

3. The converged communication device of claim 1, wherein:
   a factory reset restoring factory default configurations of the first processor only, enables first processor management while preserving second processor configuration.

4. The converged communication device of claim 1, wherein:
   the first processor is a broadband applications processor and the second processor is a baseband processor.

5. The converged communication device of claim 4, wherein:
   the broadband applications processor is an Android applications processor, and the baseband processor is a land mobile radio (LMR) baseband processor.

6. The converged communication device of claim 5, wherein an Android only factory reset of the converged communication device is performed by an Android user IT administrator for broadband device applications management while preserving LMR configuration of the LMR baseband processor.

7. The converged communication device of claim 6, wherein the factory reset to both the Android applications processor and the LMR baseband processor of the converged communication device is performed without manufacturer intervention.

8. The converged communication device of claim 1, wherein the factory reset is triggered by an external input to the converged communication device.

9. The converged communication device of claim 8, wherein the external input is provided by a user interface of the converged communication device.

10. The converged communication device of claim 8, wherein the external input is provided by a wireless cloud based internet server to the converged communication device.

11. The converged communication device of claim 8, wherein the external input is provided by a wired input to the converged communication device.

12. The converged communication device of claim 1, further comprising:
   a watchdog timer within the second processor, the watchdog timer for detecting interruptions in inter-processor communications, the watchdog timer being stopped during the factory reset while inter-processor communications (IPC) are suspended.

13. The converged communication device of claim 1, wherein when the factory reset to the first processor only is enabled, the factory reset to the first processor is delayed or paused to complete mission critical processes taking place at the second processor.

14. The converged communication device of claim 1, wherein the factory reset is performed post-deployment of the converged communication device to the field, without having to return the converged communication device to a factory or repair service center.

15. The converged communication device of claim 1, wherein the factory reset controls at least one of: preserving personalized settings and clearing personalized settings.

16. A method of reconfiguring a converged communication device, comprising:
   operating a first processor of the converged communication device using a first communications protocol;
   operating a second processor of the converged communication device using a second communications protocol, the first and second processors providing communications for the converged communication device;
   detecting, by the first processor, a factory reset to restore factory default configurations, the factory reset selectively enabling one of a multi-tier factory reset comprising:
      a factory reset of both the first and second processor;
      a factory reset of the first processor only; and a factory reset of the second processor only.

17. The method of claim 16, wherein:
in response to the first processor selectively enabling the factory reset of both the first and second processors, the first processor is reset and the second processor is reset independently of the first processor and the second processor waits for the first processor to initiate communication prior to resuming second processor normal operation;
in response to the first processor selectively enabling the factory reset of the first processor only, the second processor pauses communication with the first processor and waits for the first processor to reestablish communication prior to resuming second processor normal operation; and
in response to the first processor selectively enabling the factory reset of the second processor only, the first processor waits for the second processor to reestablish communication prior to resuming first processor normal operation.

18. The method of claim 17, wherein the factory reset is triggered by an external input to the converged communication device.

19. The method of claim 18, wherein the external input is provided to a user interface of the converged communication device.

20. The method of claim 18, wherein the external input is provided by a wireless cloud based internet server to the converged communication device.

21. The method of claim 18, wherein the external input is provided by a wired input to the converged communication device.

22. The method of claim 17, further comprising:
suspending inter-processor communications (IPC) during the factory reset; and
stopping an IPC watchdog timer of the second processor while inter-processor communications are suspended.

23. The method of claim 17, wherein enabling the factory reset of the first processor only, further comprises:
delaying or pausing the first processor to complete mission critical processes taking place at the second processor.

24. The method of claim 17, wherein:
the factory reset restoring factory default configurations of the first processor only, enables first processor management while preserving second processor configuration.

25. The method of claim 24, wherein:
the first processor is a broadband applications processor and the second processor is a baseband processor.

26. The method claim 24, wherein:
the broadband applications processor is an Android applications processor and the baseband processor is a land mobile radio (LMR) baseband processor.

27. The method of claim 26, wherein an Android only factory reset of the converged communication device is performed by an Android user IT administrator for broadband device applications management while preserving LMR configuration of the LMR baseband processor.

28. The method claim 27, wherein the factory reset to both the Android applications processor and the LMR baseband processor of the converged communication device is performed without manufacturer intervention.

29. The method of claim 16, wherein the factory reset is performed post-deployment of the converged communication device to the field, without having to return the converged communication device to a factory or repair service center.

30. The method of claim 16, wherein the factory reset controls at least one of:
preserving personalized settings and clearing personalized settings.

* * * * *